United States Patent [19]

Rhodes

[11] Patent Number: 4,877,836
[45] Date of Patent: Oct. 31, 1989

[54] VISCOSITY INDEX IMPROVER AND COMPOSITION CONTAINING SAME

[75] Inventor: Robert B. Rhodes, Houston, Tex.
[73] Assignee: Shell Oil Company, Houston, Tex.
[21] Appl. No.: 198,542
[22] Filed: May 24, 1988
[51] Int. Cl.$^4$ .................... C08L 53/02; C10M 143/10; C10M 143/12
[52] U.S. Cl. .......................................... 525/89; 252/9; 252/43; 524/505
[58] Field of Search ...................... 525/89, 314; 252/9, 252/43

[56] References Cited

U.S. PATENT DOCUMENTS

| | | | |
|---|---|---|---|
| 3,554,911 | 1/1971 | Schiff et al. | 252/59 |
| 3,668,125 | 6/1972 | Anderson | 252/59 |
| 3,700,633 | 10/1972 | Weber et al. | 260/880 B |
| 3,772,196 | 11/1973 | St. Clair et al. | 252/32.7 E |
| 3,775,329 | 11/1973 | Eckert | 252/59 |
| 3,835,053 | 9/1974 | Meier et al. | 252/59 |
| 4,116,917 | 9/1978 | Eckert | 260/33.6 AQ |
| 4,156,673 | 5/1979 | Eckert | 260/33.6 AQ |
| 4,216,131 | 8/1980 | Himes et al. | 525/89 |
| 4,391,949 | 5/1983 | St. Clair | 525/314 |

FOREIGN PATENT DOCUMENTS 997889 9/1976 Canada .............................. 525/314

Primary Examiner—Wilbert J. Briggs, Sr.

[57] ABSTRACT

A polymeric blend particularly useful as a VI improver, which polymeric blend comprises a selectively hydrogenated asymmetric radial polymer comprising a plurality of polymeric arms containing hydrogenated conjugated diolefin monomer units and at least one block copolymer arm comprising a single polymeric block containing predominantly monoalkenyl aromatic hydrocarbon monomer units and a single polymeric block containing predominantly hydrogenated conjugated diolefin monomer units and a selectively hydrogenated linear diblock copolymer containing a single polymeric block containing principally monoalkenyl aromatic hydrocarbon monomer units and a single polymeric block containing predominantly hydrogenated conjugated diolefin monomer units. Both polymers in the blend will be selectively hydrogenated so as to convert (saturate) at least 95% of the ethylenic unsaturation initially contained therein. When used as a VI improver, the polymeric blend unexpectedly improves the thickening efficiency over and above the thickening efficiency that would be expected from a consideration of the individual contribution made by each of the polymers separately. The monoalkenyl aromatic hydrocarbon polymer blocks in both polymers is preferably styrene and the conjugated diolefin in both polymers is preferably isoprene. Preferably, both polymers are selectively hydrogenated so as to convert (saturate) at least 99% of the ethylenic unsaturation initially contained therein.

30 Claims, 1 Drawing Sheet

VISCOSITY INDEX IMPROVER AND COMPOSITION CONTAINING SAME

BACKGROUND

1. Field of the Invention

This invention relates to a polymeric blend which, when added to an oil will increase its viscosity, particularly at higher temperatures, and to oil compositions comprising said polymeric blend. More particularly, this invention relates to a polymeric blend which is useful as a viscosity index improver and to oil compositions comprising said polymeric blend.

2. Prior Art

As is well known, the viscosities of lubricating oils vary with temperature, and, since lubricating oils generally incur a relatively broad temperature range during use, it is important that the oil not be too viscous (thick) at low temperatures nor too fluid (thin) at higher temperatures. As is also well known, variation in the viscosity-temperature relationship of an oil is indicated by the so-called viscosity index (VI). The higher the viscosity index, the less the change in viscosity with temperature. In general, the viscosity index is a function of the oil's viscosity at a given lower temperature and at a given higher temperature. The given lower temperature and the given higher temperature have varied over the years but are fixed at any given time in an ASTM test procedure (ASTM-D2270). Currently, the lower temperature specified in the test is 40° C. and the higher temperature specified in the test is 100° C.

Heretofore, several methods have been proposed for improving the rheological properties of lubricating oil compositions. Generally, these methods involve the use of one or more polymeric additives. Such methods wherein the polymeric additive is a linear or branched chain polymer are taught, for example, in U.S. Pat. Nos. 3,554,911; 3,668,125; 3,772,196; 3,775,329 and 3,835,053. The polymeric additives taught in this series of U.S. patents are, generally, hydrogenated, substantially linear polymers of one or more conjugated diolefins which polymers may, optionally, also contain monomeric units of one or more monoalkenyl aromatic hydrocarbons. Polymers of the type disclosed in this series of U.S. patents are typically prepared via the anionic solution polymerization of the monomers followed by hydrogenation. A selectively hydrogenated block copolymer comprising a single styrene polymer block and a single hydrogenated isoprene polymer block, which block copolymer is within the scope of the teaching of U.S. Pat. No. 3,772,196, is available commercially and is commonly used as a VI improver.

More recently, it has been discovered that certain so-called star-shaped or radial polymers, such as those disclosed in U.S. Pat. Nos. 4,116,917 and 4,156,673 can be effectively used as VI improvers in lubricating oil compositions. The polymeric additives taught in these patents are, generally, hydrogenated star-shaped or radial polymers wherein the arms are either homopolymers or copolymers of one or more conjugated diolefins or copolymers of one or more conjugated diolefins and one or more monoalkenyl aromatic hydrocarbons or a mixture of such arms. The hydrogenated star-shaped or radial polymers may be prepared by first polymerizing the arms with an anionic initiator and then coupling the living polymeric arms with a suitable coupling agent and thereafter hydrogenating the star-shaped polymer product. A star-shaped polymer wherein all of the arms are homopolymers of isoprene, which star-shaped polymer is within the scope of the teaching of both U.S. Pat. Nos. 4,116,917 and 4,156,673, is commercially available and is commonly used as a VI improver.

Even more recently, it has been discovered that certain asymmetric radial polymers are particularly effective VI improvers. This discovery is described and claimed in copending U.S. patent application Ser. No. 071,845 filed July 10, 1987, now U.S. Pat. No. 4,849,481. These asymmetric radial polymers comprise a plurality of arms, a portion of which arms are polymers of one or more conjugated diolefins and another portion of which arms are block copolymers comprising a polymeric block containing one or more monoalkenyl aromatic hydrocarbon monomer units and a polymeric block containing one or more conjugated diolefin monomer units. These asymmetric radial polymers are prepared by coupling a suitable blend of living polymers in the same manner used, generally, to prepare star-shaped polymers and then selectively hydrogenating the conjugated diolefin portion of the radial polymer.

As is also well known in the prior art, thickening efficiency of a VI improver is an important, and frequently the principal, consideration in its selection for use as a VI improver. The VI improver's ability to maintain its thickening efficiency after it has been subjected to mechanical shear is, however, also an important consideration. In general, the thickening efficiency of any given polymeric additive will vary with polymer composition and structure, but will, generally, increase with increased molecular weight of the polymer. The ability of a polymeric VI improver, on the other hand, to maintain its thickening efficiency as evidenced by its mechanical shear stability generally improves as the molecular weight of the polymer decreases. As a result, improved mechanical shear stability (improved maintenance of thickening efficiency) is, then, generally achieved at the expense of thickening efficiency although the use of an increased amount of a polymeric VI improver will offset this loss in thickening efficiency. The use of an increased amount of polymeric additive to achieve any desired thickening efficiency is, however, accompanied with several disadvantages such as increased cost of the polymeric additive itself and an increase in certin engine deposits caused by such polymeric additives. The need, then, for an improved VI improver having improved thickening efficiency, thereby requiring a reduced amount of the improver to achieve any desired viscosity index, while maintaining an acceptable mechanical shear stability is believed to be readily apparent.

SUMMARY OF THE INVENTION

It has now been discovered that the foregoing and other disadvantages of the prior art VI improvers can be overcome or at least significantly reduced with the VI improver of this invention and improved oil compositions prepared therewith. It is, therefore, an object of this invention to provide a VI improver and oil compositions containing the same. It is another object of this invention to provide such a VI improver which can be used at relatively low concentrations to produce oil compositions having acceptable rheological properties. It is yet another object of this invention to provide a VI improver, the composition of which can be varied so as to provide increased control over the balance between thickening efficiency and mechanical shear stability.

The foregoing and other objects and advantages will become apparent from the description of the invention set forth hereinafter and from the examples contained therein.

In accordance with the present invention, the foregoing and other objects and advantages are accomplished with a VI improver which is a blend of two different polymeric materials and with oil compositions comprising said blend. The polymeric blend constituting the VI improver of this invention will comprise a first polymer which is a selectively hydrogenated asymmetric radial polymer comprising a plurality of arms, a first portion of which arms will be polymers of one or more hydrogenated conjugated diolefins and a second portion of which arms will be block copolymers comprising a single polymeric block containing predominantly monoalkenyl aromatic hydrocarbon monomer units and one polymeric block containing predominantly hydrogenated conjugated diolefin monomer units, and a second polymer which is a selectively hydrogenated linear diblock copolymer comprising a single polymeric block containing predominantly monoalkenyl aromatic hydrocarbon monomer units and a single polymeric block containing principally hydrogenated conjugated diolefin monomer units. Both the selectively hydrogenated asymmetric radial polymer and the linear diblock copolymer will be selectively hydrogenated so as to convert (saturate) at least about 95% of the ethylenic unsaturation initially contained therein and such that no more than about 10% of the aromatic unsaturation initially contained therein is converted (saturated). The block copolymer arms of the selectively hydrogenated asymmetric radial polymer will be attached to the center (nucleus) of the radial polymer through the polymeric block containing predominantly conjugated diolefin monomer units.

DETAILED DESCRIPTION OF THE INVENTION

The present invention relates to a blend of polymers, which blend is useful as a VI improver, and to oil compositions containing said polymer blend. The polymer blend useful as a VI improver comprises a first polymer which is a selectively hydrogenated asymmetric radial polymer comprising a plurality of polymeric arms, a portion of which arms are polymers of one or more hydrogenated conjugated diolefins and another portion of which arms are a block copolymer comprising one polymeric block containing principally monoalkenyl aromatic hydrocarbon monomer units and one polymeric block containing predominantly hydrogenated conjugate diolefin monomer units and a second polymer which is a selectively hydrogenated diblock copolymer comprising one polymeric block containing predominantly monoalkenyl aromatic hydrocarbon monomer units and one polymeric block containing predominantly hydrogenated conjugated diolefin monomer units. The block copolymer arms of the selectively hydrogenated asymmetric radial polymer are connected to the core (nucleus) of the radial polymer through or at the polymeric block containing predominantly hydrogenated conjugated diolefin monomer units. As used herein in connection with polymer block structure or composition, the recitation "predominantly" shall mean that the specified monomer is the major component constituting at least 85 wt % of the block but other monomers may also be present. As indicated more fully hereinafter, the relative molecular weights of the respective blocks of the block copolymer arms of the selectively hydrogenated asymmetric radial polymer is important to the contribution of the selectively hydrogenated asymmetric radial polymer to the overall performance of the polymeric blend as a VI improver. The molecular weight of the arms of the selectively hydrogenated asymmetric radial polymer that contain only conjugated diolefins, a portion of which will be hydrogenated, relative to the molecular weight of the polymeric block containing predominantly hydrogenated conjugated diolefin monomer units in the block copolymer arms is also important to the asymmetric radial polymers contribution to the polymeric blend as a VI improver. As also indicated more fully hereinafter, the molecular weight of each of the polymeric blocks in the linear diblock copolymer relative to the molecular weight of the block copolymer arms of the asymmetric polymer is also important to the performance of the polymeric blend as a VI improver. In this regard, it should be noted that exact correspondence or equality of the molecular weights of the respective monoalkenyl aromatic hydrocarbon polymer blocks is not required. However, as the difference in molecular weight of the monoalkenyl aromatic hydrocarbon polymer blocks in the block copolymer arms of the asymmetric radial polymer and the linear diblock copolymer and/or the difference in molecular weight of the conjugated diolefin polymer blocks of the block copolymer arms of the asymmetric radial polymer and the diblock copolymer increases, the increase or improvement in thickening efficiency decreases. Surprisingly, the amount of polymeric blend required to produce a multigrade lubricating oil is unexpectedly low when the relative concentration of each polymer in the blend is controlled within specified limits.

The selectively hydrogenated asymmetric radial polymers useful in the polymeric composition of this invention will comprise at least one and preferably a plurality of arms comprising only conjugated diolefin monomer units consisting of a hydrogenated conjugated diolefin homopolymer or a hydrogenated copolymer of conjugated diolefins and at least one arm consisting of a selectively hydrogenated block copolymer comprising one block containing one or more hydrogenated conjugated diolefins and one block comprising one or more monoalkenyl aromatic hydrocarbons which block copolymer arm will be attached to the nucleus of the radial polymer through or at the conjugated diolefin block. The molecular weight of the hydrogenated conjugated diolefin block of the selectively hydrogenated block copolymer arms will, generally, be within the range from about 0.8 to about 1.2 times the average molecular weight of the polymeric arms containing only conjugated diolefins. For convenience, those arms contained in the selectively hydrogenated asymmetric radial polymer containing only conjugated diolefins will sometimes be referred to herein as the conjugated diolefin arms of the asymmetric polymer and those arms of the asymmetric radial polymer which comprise one polymeric block containing predominantly monoalkenyl aromatic hydrocarbon monomer units and one polymeric block containing predominantly hydrogenated conjugated diolefin monomer units will, sometimes, be referred to herein as the block copolymer arms. The molecular weight of the monoalkenyl aromatic hydrocarbon block of the block copolymer arms will range from about 0.65 to about 7.5, preferably about 0.7 to about 5.0, most preferably about 0.8 to about 2.5, times the molecular weight of the conjugated diolefin block. Selectively hydrogenated asymmetric polymers useful in the polymeric blend of this invention are described in copending U.S. patent application Ser. No. 071,845, filed July 10, 1987, the disclosure of which copending U.S. Application is incorporated herein by reference.

The selectively hydrogenated asymmetric radial polymers useful in the polymeric blend of this invention may be characterized as having a dense center or nucleus of crosslinked poly(polyalkenyl coupling agent) and a number of arms extending outwardly therefrom. The number of arms, as determined by gel permeation chromatography (GPC) may vary considerably but typically range from about 6 to about 13. The asymmetric radial polymers useful in this invention may be represented by the general formula: $(A-B)_n-X-C_p$, wherein A-B is a block copolymer comprising a block A containing predominantly monoalkenyl aromatic hydrocarbon monomer units and a block B containing selectively hydrogenated conjugated diene monomer units, C is a hydrogenated conjugated diene homopolymer or copolymer, n is a number having, on average, a value from about 0.5 to about 6.5 and p is a number having, on average, a value of from about 3 to about 11.8 with the proviso that on average, the ratio of p:n will be within the range from about 1:1 to about 10:1 and X is the poly(polyalkenyl coupling agent) nucleus. As indicated above, the nucleus X is, generally, crosslinked.

In general, the hydrogenated conjugated diolefin polymer arms in the selectively hydrogenated asymmetric radial polymer useful in the polymeric blend of this invention will have peak molecular weights, as determined by GPC, within the range from about 25,000 to about 125,000. The hydrogenated conjugated diolefin blocks of the block copolymer arms in the asymmetric radial polymer useful in the blend of this invention will have peak molecular weights, as determined by GPC, within the range from about 25,000 to about 125,000. The monoalkenyl aromatic hydrocarbon blocks will have peak molecular weights as determined by GPC within the range from about 25,000 to about 100,000. In this regard, and as indicated supra, the molecular weight of the monoalkenyl aromatic hydrocarbon polymer block will range from about 0.6 to about 7.5, preferably about 0.7 to about 5.0, most preferably about 0.8 to about 2.5 times the molecular weight of the hydrogenated conjugated diolefin block in the block copolymer. Higher values within this range are, then, applicable to lower molecular weight hydrogenated conjugated diolefin blocks while lower values within this range are applicable to higher molecular weight hydrogenated conjugated diolefin blocks. For example, and for selectively hydrogenated asymmetric radial polymers wherein the hydrogenated conjugated diolefin block is polyisoprene having a peak molecular weight of about 120,000 the monoalkenyl aromatic hydrocarbon polymer block and particularly a styrene polymer block would be most effective when the styrene block peak molecular weight ranges from about 75,000 to about 110,000 (a monoalkenyl aromatic hydrocarbon polymer-conjugated diolefin polymer molecular weight ratio within the range from about 0.62 to about 0.92. In a similar polymer, however, where the polyisoprene peak molecular weight is 8,000, polystyrene block peak molecular weights within the range from about 20,000 to about 60,000 (polystyrene:polyisoprene molecular weight ratios within the range from about 2.5 to about 7.5) are most effective.

While all of the selectively hydrogenated asymmetric radial polymers encompassed by the foregoing description are useful in the polymeric blend of the present invention and will result in a polymeric blend useful as a VI improver having improved thickening efficiency than would be expected based on results obtained with each of the polymeric components separately, best results to date have been realized with selectively hydrogenated asymmetric radial polymers having conjugated diolefin polymer arms with peak molecular weights within the range from about 35,000 to about 60,000 and block copolymer arms having conjugated diolefin peak molecular weights within the range from about 35,000 to about 60,000 and monoalkenyl aromatic hydrocarbon polymer blocks with peak molecular weights within the range from about 40,000 to about 50,000. Also, while the selectively hydrogenated asymmetric radial polymer is effective when blended with the selectively hydrogenated diblock copolymer at concentrations within the range from about 10 to about 90 wt % selectively hydrogenated asymmetric radial and about 90 to about 10 wt % selectively hydrogenated diblock copolymer, the improvement realized is generally most pronounced when the polymeric blend comprises from about 40 to about 60 wt % selectively hydrogenated asymmetric radial polymer and from about 60 to about 40 wt % of the selectively hydrogenated diblock copolymer.

The selectively hydrogenated linear diblock copolymers useful in the polymeric blends of this invention are linear diblock copolymers comprising a single polymeric block containing predominantly monoalkenyl aromatic hydrocarbon monomer units and a single polymeric block containing predominantly hydrogenated conjugated diolefin monomer units. In general, the peak molecular weight, as determined by GPC, of the monoalkenyl aromatic hydrocarbon polymer block will range from about 25,000 to about 100,000 while the peak molecular weight, as determined by GPC, of the hydrogenated conjugated diolefin polymer block will range from about 25,000 to about 200,000. Selectively hydrogenated diblock copolymers useful in the polymeric blend of this invention are described in U.S. Pat. No. 3,772,196, the disclosure of which patent is herein incoporated by reference.

As indicated supra, the molecular weight of styrene polymer block of the block copolymer arms of the asymmetric radial polymer and the styrene polymer block of the diblock copolymer need not be equal, but the improvement in thickening efficiency realized with the polymeric blend of this invention generally decreases as the difference in these molecular weights increases. As a result, best results are, generally, realized when the peak molecular weights of the two different styrene polymer blocks are approximately the same (peak molecular weights within about 10,000). While an exact value for the maximum difference that can be tolerated has not been absolutely established, it would appear from available data that the improvement in thickening efficiency is approximately zero when the difference in peak molecular weight of the styrene polymer block reaches 60,000. As a result, the difference in the peak molecular weight of the styrene polymer block of the block copolymer should not exceed about 60,000, preferably it should not exceed about 25,000 and most preferably it should not exceed about 10,000. Similarly, the molecular weights of the conjugated diolefin block in the block copolymer arms and the conjugated diolefin blocks of the diblock copolymer need not be equal, but the improvement in thickening efficiency again decreases as the difference in these molecular weights increase. Again, the exact value of the maximum value that can be tolerated has not been absolutely determined. Available data do suggest, however, that this maximum value is also about 60,000 (peak molecular weight) although some blends having a difference greater than 60,000 have been found to provide a marginal improvement in thickening efficiency. As a result, the peak molecular weight of the conjugated diolefin blocks in the block copolymer arms of the asymmetric radial polymer and of the diblock copolymer used in the polymeric blend of this invention should differ by no more than about 60,000, preferably by not more than about 25,000 and most preferably by not more than about 10,000.

As indicated supra, both the asymmetric radial polymer and the linear diblock copolymer useful in the polymeric blend of this invention will be selectively hydrogenated so as to convert (saturate) at least about 95% of the ethylenic unsaturation initially contained in the polymers after its preparation without hydrogenating more than about 10% of the aromatic unsaturation. The selective hydrogenation may, of course, be accomplished using any of the methods described in the co-pending U.S. patent application Ser. No. 071,845, filed July 10, 1987 as well as in U.S. Pat. No. 3,772,196. Of these several methods, the method for selectively hydrogenating ethylenically unsaturated polymers described in U.S. Pat. No. 3,700,663, the disclosure of which patent is herein incorporated by reference, is particularly preferred. In this particular method, hydrogenation of the polymer is accomplished in a suitable solvent with a catalyst comprising the reaction product of an aluminum alkyl and a nickel or cobalt carboxylate or alkoxide. In general, the hydrogenation is accomplished at a temperature within the range from about 25° C. to about 175° C. at a hydrogen partial pressure below about 5,000 psig, and usually at a hydrogen partial pressure within the range from about 250 to about 1,500 psig. In general, contacting times within the range from about 5 minutes to about 8 hours will be sufficient to permit the desired degree of hydrogenation. In general, the selectively hydrogenated polymers will be recovered as a crumb using known techniques. The selectively hydrogenated asymmetric radial polymer and the selectively hydrogenated linear diblock copolymers useful in this invention will, in effect, have hydrogenated conjugated diolefin segments and substantially unhydrogenated aromatic segments. When the conjugated diolefin segments are sometimes referred to herein as hydrogenated, it will be appreciated that a portion, generally less than about 5 wt %, of the conjugated diolefin monomer units may, in fact, not be hydrogenated.

In general, and when a polymeric additive is to be used as a VI improver, the polymeric additive will be dissolved in a suitable base oil at a concentration within the range from about 5 to about 20 wt % polymeric additive and this concentrate will then be used as a source of the VI improver in formulating various oils. It is, then, within the scope of the instant invention to dissolve both polymeric components of the polymeric blend useful as a VI improver in the instant invention in a suitable base oil stock at a concentration within the range from about 5 to about 20 wt % total polymer. Such concentrates will, however, generally gel at room temperature and will require heating to convert the gel to a flowable liquid state. As a result, the polymeric components of the polymeric blend useful as a VI improver in accordance with the present invention will, preferably, be concentrated in a suitable base oil stock separately at a concentration within the range from about 5 to about 20 wt % and then be separately added to the fully formulated oil stock as it, the fully formulated oil stock, is prepared.

The polymeric blend useful as a VI improver in accordance with this invention may be added to a variety of oils and greases to produce improved oil compositions generally having improved viscosity index characteristics. For example, the polymer blend may be effectively used in a variety of lubricating compositions formulated for a variety of uses. The lubricating compositions are based on diverse oils of lubricating viscosity, including natural and synthetic lubricating oils and mixtures thereof. Lubricating compositions comprising the polymeric blend of this invention are effective as crankcase lubricating oils for spark-ignited and compression-ignited internal combustion engines, including automobile and truck engines, two-cycle engines, aviation piston engines, marine and low load diesel engines and the like. Also, automotive transmission fluids, transaxle lubricants, gear lubricants, metal-working lubricants, hydraulic fluids and other lubricating oil and grease compositions can benefit from incorporation of the polymeric blend of this invention. In general, the concentration of the polymeric blend in such oils may vary between relatively wide limits with amounts within the range from about 0.5 to about 2.5 wt % being most common in the preparation of SAE 10W-40 oils with concentrations within the range from about 0.7 to about 1.75 wt % being preferred in such multigrade oils. Oil compositions prepared with the polymeric blend of this invention may also contain other additives such as antiwear agents, anticorrosive additives, antioxidants, detergents, pour point depressants, dispersants, dyes, one or more additional VI improvers and the like. Typical additives which are useful in oil compositions such as those of this invention and their description will be found, for example, in U.S. Pat. Nos. 3,772,196 and 3,835,083, the disclosure of which patents are herein incorporated by reference.

PREFERRED EMBODIMENT OF THE INVENTION

In a preferred embodiment of the present invention, the polymeric blend useful as a VI improver will comprise from about 25 to about 75 wt % of a selectively hydrogenated asymmetric radial polymer and from about 75 to about 25 wt % of a selectively hydrogenated linear diblock copolymer. Most preferably, the polymeric blend will comprise from about 40 to about 60 wt % of the selectively hydrogenated asymmetric radial polymer and from about 60 to about 40 wt % of the selectively hydrogenated linear diblock copolymer. The selectively hydrogenated asymmetric radial polymer will contain, on average, from about 7 to about 9 arms, as determined by gel permeation chromatography on a polystyrene scale. The selectively hydrogenated asymmetric radial polymer will contain, on average, one block copolymer arm per from about 6 to about 8 conjugated diolefin polymer arms. In the preferred embodiment, the conjugated diolefin block of the block copolymer arms of the asymmetric radial polymer will have a peak molecular weight within the range from about 30,000 to about 85,000; the monoalkenyl aromatic hydrocarbon block will have a peak molecular weight within the range of from about 30,000 to about 60,000; and in the preferred embodiment, the conjugated diolefin polymer arms of the asymmetric radial polymer will have peak molecular weights within the range from about 30,000 to about 85,000, with the proviso that in the preferred embodiment, the molecular weight of the conjugated diolefin block will be from about 0.9 to about 1.1 times the molecular weight of the conjugated diolefin arms and the molecular weight of the monoalkenyl aromatic hydrocarbon block will be from about 0.7 to about 5.0 times the molecular weight of the conjugated diolefin block of the block copolymer arm. In the preferred embodiment, the monoalkenyl aromatic hydrocarbon polymer block of the linear block copolymer will have a peak molecular weight within the range from about 30,000 to about 85,000 and the conjugated diolefin polymer block of the linear block copolymer will have a peak molecular weight within the range from about 40,000 to about 150,000. In the preferred embodiment, the polymer blend will be used as a VI improver in a multigrade lubricating oil. In a most preferred embodiment, the monoalkenyl aromatic hydrocarbon polymer blocks in both the asymmetric radial polymer and the linear diblock polymer will be homopolymers of styrene and the conjugated diolefin blocks as well as the conjugated diolefin polymer arms will be homopolymers of isoprene. In the most preferred embodiment of this invention, the peak molecular weight of the isoprene blocks in the block copolymer arms of the selectively hydrogenated asymmetric radial polymer will range from about 35,000 to about 60,000 and the peak molecular weight of the styrene blocks in the block copolymer arms of the selectively hydrogenated asymmetric radial polymer will range from about 40,000 to about 50,000. Also, in the most preferred embodiment, the isoprene homopolymer arms of the selectively hydrogenated asymmetric radial polymer will have a peak molecular weight within the range from about 35,000 to about 60,000. In the most preferred embodiment, the molecular weight of the styrene block in the asymmetric radial polymer will be from about 0.8 to about 2.5 times the molecular weight of the isoprene polymer blocks in the asymmetric radial polymer. Also, in the most preferred embodiment of the present invention, the styrene blocks of the selectively hydrogenated linear diblock copolymer will have a peak molecular weight within the range from about 35,000 to about 60,000 and the isoprene block of the selectively hydrogenated linear diblock will have a peak molecular weight within the range from about 50,000 to about 125,000. In the preferred embodiment, the peak molecular weights of the monoalkenyl aromatic hydrocarbon polymer blocks of the block copolymer arms and the diblock copolymer will be within about 25,000 as will the peak molecular weights of the conjugated diolefin polymer blocks. In a most preferred embodiment, the peak molecular weights of these respective blocks, monoalkenyl aromatic hydrocarbon v. monoalkenyl aromatic hydrocarbon and conjugated diolefin v. conjugated diolefin, will differ by no more than 10,000.

Having thus broadly described the present invention, a preferred and most preferred embodiment thereof, it is believed that the invention will become even more apparent by reference to the following examples. It will be appreciated, however, that the examples are presented solely for purposes of illustration and should not be construed as limiting the invention unless one or more limitations introduced in the examples are incorporated into the claims appended hereto and then only to the extent that such limitations are thus incorporated.

EXAMPLE 1

In this example, a series of selectively hydrogenated asymmetric radial polymers having, on average, 7 isoprene homopolymer arms and, on average, a single block copolymer arm comprising a single block of polystyrene and a single block of isoprene were prepared. The several polymers, eleven in all, varied primarily as to the molecular weight of the isoprene homopolymer arms, the molecular weight of the isoprene block in the block copolymer arms and the molecular weight of the polystyrene block in the block copolymer arms. Each of the polymers was prepared using one of the methods taught in copending U.S. patent application Ser. No. 071,845; viz., by first preparing the polystyrene blocks for the block copolymer arms and then preparing the polyisoprene blocks and the polyisoprene homopolymer arms. This was accomplished by placing the requisite amount of styrene and a suitable anionic initiator, in this case, s-butyllithium, in cyclohexane, heating the solution and continuing the polymerization until the styrene had been substantially completely polymerized. The isoprene polymer blocks and the isoprene homopolymer arms were then prepared by first adding additional anionic initiator to the polystyrene solution and then the requisite amount of isoprene to grow isoprene blocks and homopolymers of the desired molecular weight. Polymerization in this step was continued until substantially all of the isoprene had polymerized. After the polymerization was completed, a sufficient amount of a coupling agent, in this case divinyl benzene, was added to the polymer solution and the coupling reaction allowed to proceed until substantially completed, in this case, for approximately one hour. In each case, at least about 90% of the living polymer was incorporated into the radial polymer. After preparation of the asymmetric radial polymer was completed, the radial polymer was then selectively hydrogenated, using a catalyst prepared by combining nickel octoate and triethyl aluminum, so as to convert (saturate) about 99% of the ethylenic unsaturation initially present in the polymer. For convenience, the 11 polymers prepared in this example will be identified with the numerals 1-11. For convenience, the characteristics of each polymer such as the molecular weight of the polystyrene block and the molecular weight of both the polyisoprene block and the isoprene homopolymer arms which molecular weight was substantially the same in each polymer, is summarized in the following table along with the polymer number.

TABLE

| Asymmetric Polymer No. | Polystyrene MW × 10$^{-3}$ | Polyisoprene MW × 10$^{-3}$ |
|---|---|---|
| 1 | 31 | 28 |
| 2 | 48 | 36 |
| 3 | 40 | 37 |
| 4 | 52 | 29 |
| 5 | 40 | 36 |
| 6 | 31 | 43 |
| 7 | 57 | 38 |
| 8 | 68 | 42 |
| 9 | 19 | 36 |
| 10 | 91 | 38 |
| 11 | 47 | 48 |

EXAMPLE 2

Figure 1:
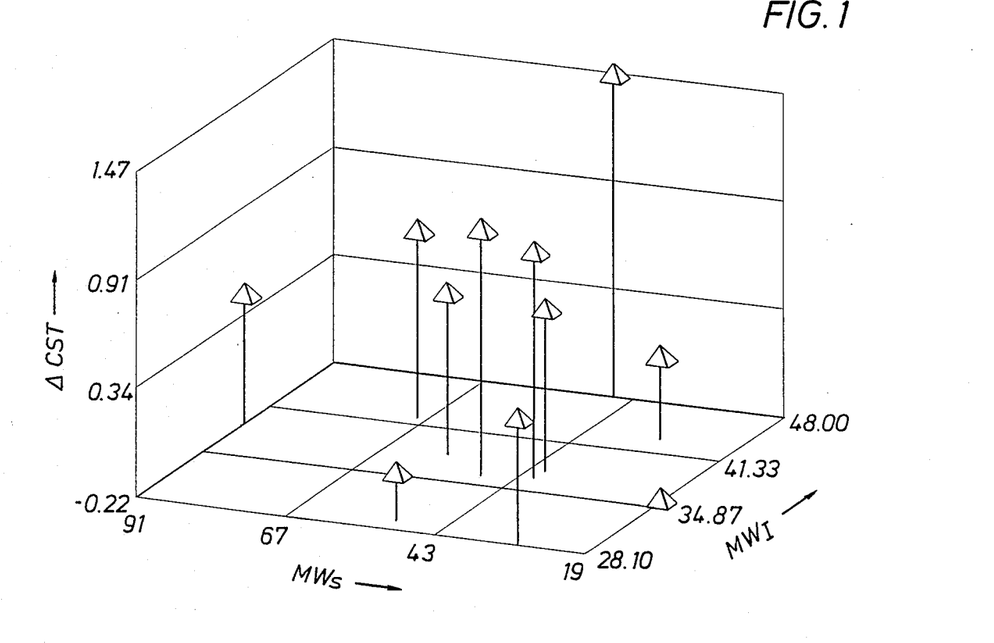
FIG. 1 is a three dimensional plot showing the difference in the kinematic viscosity actually obtained and the kinematic viscosity that would be expected with certain polymeric blends within the scope of this invention containing 50 wt % of an asymmetric radial polymer and 50 wt % of a linear diblock copolymer.

In this Example, the asymmetric radial polymers prepared in Example 1 were used as VI improvers in an SAE 10W-40 lubricating oil having target kinematic viscosities of 14 cSt at 100° C. and target cold cranking simulator viscosities of 3250 cP at −20° C. The amount of VI improver added and the base stock, then, was adjusted to meet these targets. Also in this Example, a selectively hydrogenated linear diblock copolymer having a polystyrene block having a peak molecular weight of 35,000 and a polyisoprene block having a peak molecular weight of 65,000, 99% of the ethylenic unsaturation initially contained therein having been converted (saturated) as a result of hydrogenation, was used as a VI improver in an SAE 10W-40 lubricating oil having the same target properties as the SAE 10W-40 lubricating oil prepared with the asymmetric radial polymers from Example 1. Again, the amounts of VI improver actually added was adjusted to meet these targets. Each of the SAE 10W-40 lubricating oils prepared in this example contained 7.75 wt % of a commercially available multigrade lubricating oil additive package (Lubrizol 7573) and 0.3 wt % Acroloid 160. The SAE 10W-40 lubricating oils were prepared with a blend of HVI 100N and HVI 250N oil base stocks. The amount of each of these oils actually used was varied so as to meet the targets of the multigrade oil produced. The amount of the selectively hydrogenated linear diblock copolymer required to prepare the SAE 10W-40 lubricating oil having the desired specifications was 1.21 wt %, based on polymer plus oil, of the polymer. The SAE 10W-40 lubricating oil prepared with the selectively hydrogenated linear diblock copolymer actually had a kinematic viscosity at 100° C. of 13.78 cSt. After the SAE 10W-40 lubricating oils were prepared and the kinematic viscosities thereof at 100° C. determined, portions of the SAE 10W-40 oil prepared with the selectively hydrogenated linear diblock copolymer were then blended with portions of the several SAE 10W-40 oils prepared with the asymmetric radial polymers of Example 1 so as to prepare blends containing first 75 wt % of the multigrade oil prepared with a linear diblock and 25% of the oil containing the polymer of Example 1, a blend containing 50 wt % of the multigrade oil prepared with the diblock copolymer and 50 wt % of the multigrade oil prepared with each of the polymers from Example 1 and a blend comprising 25 wt % of the multigrade oil prepared with the linear diblock copolymer and 75% of the multigrade oil prepared with the several copolymers from Example 1. After preparation of the several blends, the kinematic viscosity of each blend at 100° C. was determined. The results actually obtained with each of the blends as well as the kinematic viscosity of the multigrade oils prepared with the polymers of Example 1 are summarized in the following table. The table also reflects the wt % of asymmetric radial polymer from Example 1 required to produce the desired SAE 10W-40 oil composition. For convenience, the results are tabulated by reference to the number of the asymmetric polymer assigned in Example 1. The table also reflects the actual difference (increase or decrease) in the kinematic viscosity at 100° C. of the 50/50 blend oils from that that would have been expected by averaging the kinematic viscosities of the separate blends and this different for the 50/50 blend is graphed in the three dimensional plot shown in FIG. 1 as a function of the polystyrene block peak molecular weight (MW$_s$) and the polyisoprene molecular wt (MW$_I$). This change is listed under the column headed ΔcSt.

TABLE

| Asymmetric Polymer No. | Wt % Polymer in SAE 10W-40 Oil | Kinematic Viscosity cSt at 100° C. | | | | ΔcSt |
|---|---|---|---|---|---|---|
| | | 75% Diblock 25% Example 1 Polymer | 50% Diblock 50% Example 1 Polymer | 25% Diblock 75% Example 1 Polymer | All Example 1 Polymer | |
| 1 | 1.12 | 14.04 | 14.35 | 14.30 | 13.92 | +0.50 |
| 2 | 1.18 | 14.67 | 15.51 | 15.81 | 15.05 | +1.095 |
| 3 | 1.25 | 14.17 | 14.57 | 14.70 | 14.05 | +0.66 |
| 4 | 1.15 | 13.79 | 13.91 | 13.80 | 13.90 | +0.07 |
| 5 | 1.05 | 14.39 | 14.95 | 14.83 | 14.13 | +1.00 |
| 6 | 1.30 | 13.79 | 14.03 | 14.00 | 13.74 | +0.27 |
| 7 | 0.95 | 14.11 | 14.25 | 14.18 | 13.43 | +0.65 |
| 8 | 0.85 | 14.07 | 14.07 | 13.71 | 12.81 | +0.78 |
| 9 | 1.35 | 13.60 | 13.60 | 13.69 | 13.87 | −0.22 |
| 10 | 1.05 | 14.14 | 14.31 | 13.71 | 13.90 | +0.47 |
| 11 | 0.81 | 14.60 | 15.15 | 15.01 | 13.58 | +1.47 |

As will be apparent from the data summarized in the foregoing table, each of the blends produced an SAE 10W-40 oil having a kinematic viscosity at 100° C. higher than that of the SAE 10W-40 oil prepared with either the selectively hydrogenated diblock copolymer of the selectively hydrogenated asymmetric polymer of Example 1, except for the blends containing the selectively hydrogenated asymmetric polymer from Example 1 identified as No. 9. The increase in kinematic viscosity resulting from the blend is, of course, surprising in that the kinematic viscosity of oil compositions containing different VI improvers is unchanged or more generally, is decreased when the multigrade oils are blended. This then clearly indicates that oils containing a polymeric blend comprising an asymmetric polymer and a diblock copolymer will, generally, possess increased kinematic viscosities due to the surprising increase in thickening efficiency of the blend. The one blend that did not increase the kinematic viscosities; i.e., the blend containing polymer 9 from Example 1, apparently did not increase the kinematic viscosity due to the low peak molecular weight of the polystyrene block in the block copolymer arm of the asymmetric radial polymer. As will be apparent from FIG. 1, the increase in kinematic viscosity with the 50/50 blend generally increases as the peak molecular weight of the polyisoprene block in the block copolymer arm of the asymmetric radial polymer increases, at least over the molecular weight range illustrated. The affect of the molecular weight of the polystyrene block on the other hand appears less significant although the best increases in thickening efficiency did occur at polystyrene peak molecular weights within the range from about 40,000 to about 68,000.

EXAMPLE 3

In this example, two selectively hydrogenated asymmetric radial polymers, one having 25% copolymer arms and the other 75% copolymer arms, were prepared using the same method summarized in Example 1 except that the ratio of block copolymer arms to homopolymer arms in the solution ultimately contacted with the coupling agent was adjusted to provide, on average, the specified ratio of block copolymer arms in the resulting asymmetric radial polymers. Again, the block copolymer arms contained a single polystyrene block and a single hydrogenated polyisoprene block. The homopolymer arms were again hydrogenated polyisoprene. Both polymers were hydrogenated to the extent of about 1% residual ethylenic unsaturation. The polymer containing 25% copolymer arms also contained 75% homopolymer arms while the polymer containing 75% copolymer arms contained 25% homopolymer arms. In preparing the polymer containing 25% copolymer arms, the amount of styrene and anionic initiator added during the preparation of the polystyrene blocks and the amount of additional anionic initiator added after polymerization of the styrene was completed as well as the amount of isoprene added were controlled to provide a block copolymer having a polystyrene block with a peak molecular weight of 30,000 and a hydrogenated polyisoprene block with a peak molecular weight of 35,000 and hydrogenated polyisoprene homopolymer arms having a peak molecular weight of 35,000. In the preparation of the polymer containing 75% block copolymer arms, the same variables were controlled to produce a block copolymer with a polystyrene block having a peak molecular weight of 10,000 and a hydrogenated polyisoprene block having a peak molecular weight of 62,000 and hydrogenated isoprene homopolymers also having a peak molecular weight of 62,000. Both of the asymmetric radial polymers prepared in this Example were next used as VI improvers in an SAE 10W-40 multigrade lubricating oil prepared in the same manner and to the same targets as was used in Example 2. Again, the SAE 10W-40 multigrade lubricating oils had a target kinematic viscosity of 14 cSt at 100° C. and a target Cold Cranking Simulator viscosity of 3250 cP at −20° C. The amount of each asymmetric polymer needed to produce the specified multigrade oil is summarized in the table set forth after this Example. Portions of the SAE 10W-40 multigrade lubricating oils prepared with the selectively hydrogenated asymmetric polymers of this Example were then blended with portions of a multigrade oil identical to that prepared with the diblock copolymer in Example 2 to produce SAE 10W-40 oil blends containing the same relative proportions of each polymeric component (and the same relative proportions of each SAE 10W-40 oil) as the blends prepared in Example 2 and the kinematic viscosity at 100° C. was determined for each of the blends as well as for each of the multigrade oils prepared with the selectively hydrogenated asymmetric radial polymers of this Example. The values actually obtained are summarized in the table set forth below. For convenience, the selectively hydrogenated asymmetric radial polymer having, on average, 25% copolymer arms is identified as asymmetric polymer No. 12 and the selectively hydrogenated asymmetric radial polymer having 75% copolymer arms is identified as asymmetric polymer No. 13. The following table also indicates the difference in the actual viscosity for the blends containing 50 wt % of each polymer and the expected viscosity for such a blend, said value being determined in the same manner as was used in Example 2.

TABLE

| | | Kinematic Viscosity cSt at 100° C. | | | | |
|---|---|---|---|---|---|---|
| Asymmetric Polymer No. | Wt % Polymer in SAE 10W-40 Oil | 75% Diblock 25% Asymmetric 1 Polymer | 50% Diblock 50% Asymmetric Polymer | 25% Diblock 75% Asymmetric Polymer | All Asymmetric Polymer | ΔcSt |
| 12 | 1.17 | 13.63 | 13.34 | 13.19 | 12.57 | +0.16 |
| 13 | 0.85 | 13.87 | 13.80 | 13.77 | 13.77 | +0.02 |

As will be apparent from the data summarized in the preceding Table, none of the blends prepared with the asymmetric polymer identified as polymer No. 12 had a kinematic viscosity greater than the kinematic viscosity obtained when the diblock copolymer was used alone. The kinematic viscosity for each blend was, however, greater than would have been expected based on the relative proportions of the separate polymeric materials. Certain of the blends prepared with the asymmetric polymer identified as polymer No. 13 were, however, greater than the kinematic viscosities of the multigrade oils prepared with either of the polymeric components separately. The improvement was, however, marginal and may not be significant. The reduced performance of each of these polymers is believed to be due to the relatively low ratio of homopolymer arms to block copolymer arms in both of the asymmetric polymers used and to the low polystyrene block molecular weight in asymmetric polymer 13.

EXAMPLE 4

Figure 2:
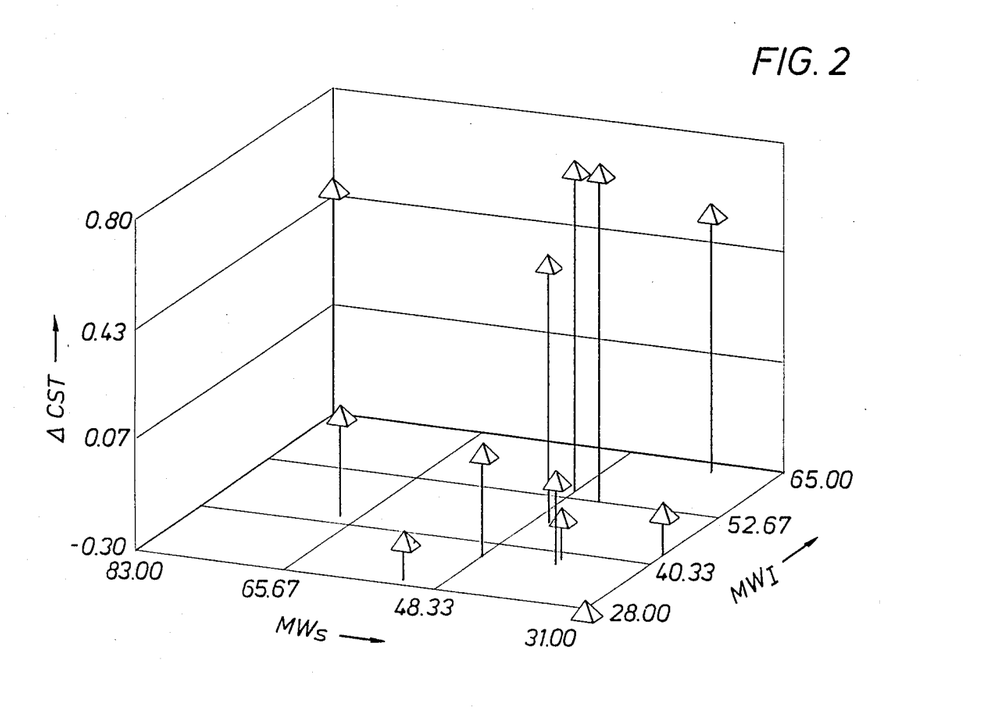
FIG. 2 is a three dimensional plot showing the difference in the kinematic viscosity actually obtained and the kinematic viscosity that would be expected with certain polymeric blends within the scope of this invention containing 50 wt % of an asymmetric radial polymer and 50 wt % of a different linear diblock copolymer.

In this example, portions of the SAE 10W-40 lubricating oil compositions prepared with asymmetric polymers Nos. 1, 2, 3, 4, 5, 6, 8 and 11 prepared in Example 2 were blended with an SAE 10W-40 multigrade lubricating oil prepared with a diblock copolymer comprising a single polystyrene block having a peak molecular weight of 44,000 and a single hydrogenated polyisoprene block having a peak molecular weight of 106,000. The diblock was selectively hydrogenated so as to convert (saturate) 99% of the ethylenic unsaturation initially contained therein. The blends were prepared in the same manner and in the same proportions as was used in the preparation of the blends in Example 2. In preparing the multigrade oil with the diblock copolymer in this example, it was determined that 0.80 wt % of the diblock copolymer was required to produce the multigrade oil and the multigrade oil thus produced has a kinematic viscosity at 100° C. of 13.82 cSt. After each of the blends were prepared, the kinematic viscosity at 100° C. was then determined and the results obtained are summarized in the following table. The table also reflects the ΔcSt for the 50/50 blend. The ΔcSt was determined in the same manner as was used in Example 2. The difference in kinematic viscosity for the 50/50 blend is graphed, along with data obtained in Example 6, in the three dimensional plot shown in FIG. 2 as a function of the peak molecular weight of the polystyrene block in the block copolymer arms of the asymmetric radial polymer and the peak molecular weight of the polyisoprene block in the block copolymer arms of the asymmetric radial polymer.

TABLE

| Asymmetric Polymer No. | Kinematic Viscosity cSt at 100° C. | | | |
|---|---|---|---|---|
| | 75% Diblock 25% Example 1 Polymer | 50% Diblock 50% Example 1 Polymer | 25% Diblock 75% Example 1 Polymer | ΔcSt |
| 1 | 13.46 | 13.54 | 13.65 | −0.30 |
| 2 | 14.09 | 14.52 | — | +0.09 |
| 3 | 13.66 | 13.82 | 13.91 | −0.09 |
| 4 | 13.61 | 13.68 | 13.72 | −0.14 |
| 5 | 14.15 | 14.00 | 14.07 | +0.03 |
| 6 | 13.83 | 13.66 | 13.71 | −0.16 |
| 8 | 13.61 | 13.38 | 12.75 | +0.07 |
| 11 | 14.11 | 14.24 | 14.12 | +0.54 |

As will be apparent from the data summarized in the preceding table, the blends prepared with multigrade oils containing asymmetric polymer Nos. 1, 3, 4 and 6 really did not show an increase in thickening efficiency. This failure to show an unexpected increase is believed to be due to the difference in peak molecular weight of the conjugated diolefin polymeric blocks in the block copolymer arms of the asymmetric radial polymer and the peak molecular weight of the conjugated diolefin polymeric blocks in the linear diblock copolymer (a difference greater than about 60,000). As will also be apparent from the data summarized in the preceding table, the blends prepared with a multigrade oil containing asymmetric polymer Nos. 2, 5 and 8 exhibited only marginally improved thickening efficiency. This marginal improvement is again believed due to the large difference in peak molecular weights of the isoprene polymer blocks in the block copolymer arms of the asymmetric radial polymer and the diblock copolymer (again greater than 60,000 in each case). As will further be apparent from the data summarized in the preceding table, the blends prepared with the multigrade oil containing asymmetric polymer No. 11 had significantly improved thickening efficiency. This is, of course, as expected since the molecular weights of the polymeric blocks of the asymmetric radial polymer are higher and there is a closer correspondence in the molecular weights of these blocks and the polymeric blocks of the diblock copolymer. As is apparent from FIG. 2, the improvement in thickening efficiency as reflected by an increase in kinematic viscosity for an equal weight blend increased with increasing peak molecular weight of the polyisoprene block in the block copolymer arms of the asymmetric radial polymer. The improvement, however, with respect to peak molecular weight of the polystyrene block of the block copolymer arms of the asymmetric radial polymer appears as a maximum for polystyrene peak molecular weights within the range from about 40,000 to about 68,000.

EXAMPLE 5

In this example, four additional selectively hydrogenated asymmetric radial polymers were prepared using the same method as is summarized in Example 1. In preparing these selectively hydrogenated asymmetric radial polymers, the amount of styrene, anionic initiator (both additions) and isoprene was varied so as to produce polymers having the desired molecular weights. Each of the four radial polymers were selectively hydrogenated in the same manner as is summarized in Example 1 to a residual ethylenic unsaturation of less than about 1%, based on initial unsaturation. For convenience, the four polymers prepared in this example are hereinafter referred to as asymmetric radial polymer Nos. 14, 15, 16 and 17. 12.5% of the total arms of each of the four polymers were block copolymer arms. The peak molecular weights of the hydrogenated isoprene block in the block copolymer arm and the hydrogenated isoprene homopolymer were at least approximately the same in each polymer. The molecular weights of the polystyrene blocks actually obtained as well as the molecular weights of the hydrogenated isoprene blocks and the hydrogenated isoprene homopolymer arms are summarized in the following table:

TABLE

| Asymmetric Polymer No. | Polystyrene MW × $10^{-3}$ | Polyisoprene MW × $10^{-3}$ |
|---|---|---|
| 14 | 38 | 63 |
| 15 | 45 | 53 |
| 16 | 49 | 56 |
| 17 | 83 | 65 |

EXAMPLE 6

In this example, the polymers prepared in Example 5 were used to formulate an SAE 10W-40 lubricating oil having target kinematic viscosities of 14 cSt at 100° C. and target cold cranking simulator viscosities of 3250 cP at −20° C. Also in this example, a selectively hydrogenated linear diblock copolymer identical to that used in Example 4 was used to formulate an SAE 10W-40 lubricating oil having the same properties as the SAE 10W-40 lubricating oil prepared with the diblock copolymer in Example 4. Each of the SAE 10W-40 lubricating oils prepared in this example contained 7.75 wt % of a commercially available multigrade lubricating oil additive package (Lubrizol 7573) and 0.3 wt % Acryloid 160. The SAE 10W-40 lubricating oils were prepared with a blend of HVI 100N and HVI 250N oil base stocks. The amount of diblock copolymer required to prepare an SAE 10W-40 lubricating oil having the desired specifications was 0.80 wt % of the polymer. The SAE 10W-40 lubricating oil prepared with the diblock copolymer actually had a kinematic viscosity at 100° C. of 13.82 cSt. After the SAE 10W-40 lubricating oils containing the asymmetric radial polymer were prepared and the kinematic viscosities thereof at 100° C. determined, portions of the SAE 10W-40 oil prepared with the selectively hydrogenated linear diblock copolymer was then blended with portions of the SAE 10W-40 oils prepared with the selectively hydrogenated asymmetric polymers of Example 5 so as to prepare blends containing first 75 wt % of the multigrade oil prepared with the selectively hydrogenated linear diblock and 25% of the oil containing the polymer of Example 5, a blend containing 50 wt % of the multigrade oil prepared with the diblock copolymer and 50 wt % of the multigrade oil prepared with each of the polymers from Example 5 and a blend comprising 25 wt % of the multigrade oil prepared with the linear diblock copolymer and 75% of the multigrade oils prepared with the several copolymers from Example 5. After preparation of the several blends, the kinematic viscosity of each blend at 100° C. was determined. The results actually obtained with each of the blends as well as the kinematic viscosity of the multigrade oils prepared with the polymers of Example 5 are summarized in the following table. The table also reflects the wt % of the polymer of Example 5 required to produce the desired SAE 10W-40 oil composition. For convenience, the results are tabulated by reference to the number of the asymmetric polymer assigned in Example 5. The table also reflects the difference (increase or decrease) in the kinematic viscosity at 100° C. of the 50/50 blend from that that would have been expected by averaging the kinematic viscosities of the separate blends. This difference is listed under the column headed ΔcSt. This difference is also graphed in the three dimensional plot shown in FIG. 2, which FIG. 2 has already been discussed in discussing the results obtained in Example 4.

wt % HVI 250N, the amount of polymer shown and the rest HVI 100N. The actual concentration of polymer or polymer blend in each of the oils and the kinematic viscosity at 100° C. of each of the oil compositions is summarized in the following table. For convenience, the kinematic viscosity that would have been expected with the polymeric blend has been set forth in parenthesis immediately after the actual kinematic viscosity determined for each of the oil compositions containing the polymer blends.

TABLE

| VI Improver | In HVI 100 N | | Blend | |
|---|---|---|---|---|
| | % wt | KV. 100° C., cSt | % wt | KV. 100° C., cSt |
| Polymer 3 | 0.7 | 8.41 | 0.6 | 9.21 |
| Polymer 3 | 1.0 | 10.30 | 1.0 | 12.17 |
| Polymer 3 | 1.5 | 14.44 | 1.4 | 16.19 |
| Diblock | 0.7 | 8.15 | 0.6 | 8.93 |
| Diblock | 1.0 | 10.29 | 1.0 | 12.02 |
| Diblock | 1.5 | 15.63 | 1.4 | 16.64 |
| Blend | 0.7 | 8.48 (8.28) | 0.6 | 9.28 (9.07) |
| Blend | 1.0 | 10.70 (10.30) | 1.0 | 12.73 (12.10) |
| Blend | 1.5 | 16.23 (15.04) | 1.4 | 17.82 (16.42) |

As will be apparent from the data summarized in the preceding table, the polymeric blend containing 50 wt % of the asymmetric polymer identified as polymer 3 and 50 wt % of the diblock copolymer in each case (at all concentrations tested) yielded an oil composition having a kinematic viscosity greater than the kinematic

TABLE

| | | Kinematic Viscosity cSt at 100° C. | | | | |
|---|---|---|---|---|---|---|
| Asymmetric Polymer No. | Wt % Polymer in SAE 10W-40 Oil | 75% Diblock 25% Asymmetric Polymer | 50% Diblock 50% Asymmetric Polymer | 25% Diblock 75% Asymmetric Polymer | All Asymmetric Polymer | ΔcSt |
| 14 | 0.79 | 14.14 | 14.34 | 14.30 | 13.73 | +0.57 |
| 15 | 0.76 | 14.21 | 14.56 | 14.40 | 13.72 | +0.80 |
| 16 | 0.76 | 14.23 | 14.57 | 14.53 | 13.81 | +0.76 |
| 17 | 0.71 | 14.02 | 14.24 | 14.12 | 13.71 | +0.47 |

As will be apparent from the data summarized in the preceding table, each of the multigrade oil blends prepared with asymmetric polymers 14–17 exhibited significantly improved thickening efficiency. This improvement is, of course, reflected in the significant increase in the kinematic viscosity of these blends. As will be apparent from a comparison of the results summarized in the preceding table and the results obtained with the multigrade oil blends containing asymmetric polymer No. 11 in Example 4 the significant increase in thickening efficiency resulted from molecular weight increases of the polyisoprene and/or polystyrene blocks of the block copolymer arms of the asymmetric radial polymer and a better correspondence between the molecular weights of these blocks and the corresponding blocks in the linear diblock copolymer.

EXAMPLE 7

In this example, the thickening efficiency of the selectively hydrogenated asymmetric radial polymer prepared in Example 1 and identified as polymer 3, a selectively hydrogenated diblock copolymer identical to that used in preparing the blends of Example 2 (99% of the initial ethylenic unsaturation converted) and a polymeric blend containing 50 wt % of each of these polymers was determined at three different concentrations in oil in two different base oil stocks. The first base oil stock used was an HVI 100N base oil stock while the second base oil stock tested was a blend containing 30 viscosity of oil compositions containing one or the other polymer at the same concentration. This increase in kinematic viscosity does, of course, reflect an improvement in thickening efficiency and this improvement is unexpected.

EXAMPLE 8

In this example, the thickening efficiency of the selectively hydrogenated asymmetric radial polymer prepared in Example 5 and identified as polymer 15, a selectively hydrogenated diblock copolymer identical to that used in Example 7 and a polymeric blend containing 50 wt % of each of these polymers was determined at two different concentrations in a base oil stock. The base oil stock used was an HVI 100N base oil stock. The actual concentration of polymer or polymer blend in each of the oil compositions and the kinematic viscosity of each is summarized in the following table. For convenience, the kinematic viscosity that would have been expected in the blend has been set forth in parenthesis immediately after the actual kinematic viscosity determined for each of the oil compositions containing the polymer blends.

TABLE

| VI Improver | % wt | KV. 100° C., cSt |
|---|---|---|
| Polymer 15 | 0.7 | 10.95 |
| Polymer 15 | 1.0 | 15.75 |

TABLE-continued

| VI Improver | % wt | KV. 100° C., cSt |
|---|---|---|
| Diblock | 0.7 | 8.15 |
| Diblock | 1.0 | 10.29 |
| Blend | 0.7 | 10.50 (9.55) |
| Blend | 1.0 | 15.60 (13.02) |

As will be apparent from the data summarized in the preceding table, each of the oil compositions prepared with the polymeric blends had a higher kinematic viscosity at 100° C. than would have been expected from a consideration of the individual contributions made by each of the polymeric additives separately. In this case, however, none of the kinematic viscosities of the compositions containing the blend were higher than the highest kinematic viscosity exhibited by the oils containing polymer 15 separately. Nevertheless, the increase in kinematic viscosity with the blend when compared to the kinematic viscosity that would have been expected is quite significant. The correspondence between styrene polymer block molecular weights and isoprene polymer block molecular weights of the asymmetric radial and the linear diblock was well within acceptable limits.

EXAMPLE 9

In this example, fully formulated SAE 10W-40 multigrade lubricating oils were prepared with different VI improvers. These multigrade oils were then subjected to a series of tests commonly performed on multigrade lubricating oils. The multigrade oils were formulated so as to produce SAE 10W-40 multigrade lubricating oils having a target kinematic viscosity of about 14 cSt at 100° C. and a target cold cranking simulator viscosities of about 3,250 at −20° C. The first of the multigrade lubricating oils was prepared with a selectively hydrogenated diblock copolymer identical to that used in Example 2. The second was prepared with a selectively hydrogenated asymmetric radial polymer identical to that prepared in Example 1 and identified as asymmetric polymer No. 3. The third was prepared with a VI improver polymeric blend consisting of 50 wt % of the same selectively hydrogenated diblock copolymer used in the first composition of this Example and 50 wt % of the selectively hydrogenated asymmetric radial polymer used in the second composition of this Example. The fourth composition was prepared with a selectively hydrogenated asymmetric radial polymer identical to that prepared in Example 5 and identified therein as asymmetric polymer No. 15. The fifth composition prepared and tested in this Example was prepared with a VI improver polymeric blend consisting of 50 wt % of the same selectively hydrogenated diblock copolymer used in the first composition of this Example and 50 wt % of a selectively hydrogenated asymmetric radial polymer identical to that used in the fourth multigrade oil compositions prepared in this example. Each of the SAE 10W-40 oils prepared in this Example contained 7.75 wt % of a commercially available lubricating oil additive package (Lubrizol 7573) and 0.3 wt % of a commercially available pour point depressant (Acryloid 160). In each case, the base oil stock was a blend of HVI-100N and HVI-250N base oil stocks. The amount of HVI-250N used in each composition as well as the amount of VI improver was varied to produce the desired SAE 10W-40 multigrade lubricating oil. The amount of HVI 250N base oil stock and the amount of VI improver actually used are summarized in the Table set forth hereinafter. After the multigrade lubricating oils were prepared the kinematic viscosity at 100° C., the viscosity index, the cold cranking simulator (CCS) viscosity at −20° C., the engine oil pumpability at −25° C. using the mini-rotary viscometer (MRV) technique (ASTM D4684), the high temperature high shear rate (HTHSR) viscosity at 150° C. and at $1 \times 10^6 \sec^{-1}$ using the tapered bearing simulator (TBS) technique (ASTM D4683) and the mechanical shear stability, as reflected by % loss in viscosity, using the DIN test (ASTM D 3945) were determined for each of the lubricating oil compositions. For convenience, the first through the fifth compositions prepared herein are identified in the table as compositions Nos. 1-5, respectively.

TABLE

| Composition No. | % HVI 250 N | Total Polymer % wt. | KV, 100° C., cSt | Viscosity Index | CCS, −20° C., cP | TP1-MRV −25° C., cP | TBS, 150° C., cP | DIN Test, % Vis. Loss |
|---|---|---|---|---|---|---|---|---|
| 1 | 30.0 | 1.20 | 14.03 | 170 | 3,149 | 16,358 | 3.20 | 11.1 |
| 2 | 24.5 | 1.27 | 14.06 | 108 | 3,207 | 20,719 | 3.63 | 14.0 |
| 3 | 30.0 | 1.14 | 13.73 | 135 | 3,060 | 16,190 | 3.27 | 15.7 |
| 4 | 31.6 | 0.76 | 14.12 | 141 | 3,251 | 18,443 | 3.23 | 34.4 |
| 5 | 33.3 | 0.78 | 13.80 | 153 | 3,317 | 18,230 | 3.05 | 32.7 |

As will be apparent from the data summarized in the foregoing table, composition 3 containing the VI improver polymer blend required 5% less polymer than did composition 1 which was prepared with the single polymer having the best thickening efficiency. Composition 5, on the other hand, contained significantly less polymer than was required in composition 1 and only slightly more of the total polymer blend than was required in composition 4. In this regard, it should be noted, that if the thickening efficiencies of the polymers were simply additive, one would expect that it would take approximately 0.98 wt % of the blend to achieve the desired kinematic viscosity in Composition 5. The actual result obtained, then, reflects an improvement of about 20.4% in thickening efficiency. Also, as will be apparent from the data summarized in the preceding table, the high shear rate viscosity response as measured in the tapered bearing simulator (TBS) for composition 3 was higher, but perhaps not significantly higher, than that of composition 1. In certain cases, then, at least, VI improver polymeric blends exhibiting increased thickening efficiency which also produce multigrade oils having higher HTHSR viscosities can be prepared. Composition 5, on the other hand, had a lower HTHSR viscosity value. This, then, suggests that multigrade oils having lower HTHSR values can also be prepared with the polymeric blend VI improvers of this invention.

EXAMPLE 10

In this example, fully formulated SAE 10W-40 multigrade lubricating oils were prepared with different VI improvers in a manner identical to that used in Example 9 except that a selectively hydrogenated linear diblock copolymer comprising a single polystyrene block having a weight average molecular weight of 44,000 and a single hydroentated polyisoprene block having a weight average molecular weight of 106,000 was substituted for the selectively hydrogenated linear diblock copolymer used in Example 9. These multigrade oils were then subjected to the same series of tests which were completed in Example 9. The lubricating oils were again formulated so as to produce a SAE 10W-40 multigrade lubricating oil having a target kinematic viscosity of 14 cSt at 100° C. and a target cold cranking simulator viscosity of about 3,250 at −20° C. The first of the multigrade lubricating oils of this Example was, then, prepared with the selectively hydrogenated diblock copolymer as the sole VI improver. The second oil composition, like composition 2 in Example 9, was prepared with a selectively hydrogenated asymmetric radial polymer identical to that prepared in Example 1 and identified as asymmetric polymer No. 3. The third lubricating oil of this Example was prepared with a polymer blend as the VI improver, said blend, consisting of 50 wt % of the selectively hydrogenated diblock copolymer used in the first composition of this Example and 50 wt % of the selectively hydrogenated asymmetric polymer used in the second composition of this Example. The fourth composition of this Example, like the fourth oil composition of Example 9, was prepared with a selectively hydrogenated asymmetric radial polymer identical to that prepared in Example 5 and identified therein as asymmetric polymer No. 15. The fifth composition prepared and tested in this example was prepared with a polymeric blend VI improver, said blend consisting of 50 wt % of a selectively hydrogenated diblock copolymer identical to that used in the first composition of this Example and 50 wt % of a selectively hydrogenated asymmetric radial polymer identical to that used in the fourth composition of this Example. Each of the multigrade oil compositions prepared in this example again contained 7.75 wt % of a commercially available lubricating oil additive package (Lubrizol 7573) and 0.3 wt % of a commercially available pour point depressant (Acryloid 160). In each case, the base oil stock was again a blend of HVI-100N and HVI-250N base oil stocks. The amount of HVI-250N used in each composition as well as the amount of VI improver was varied to produce the desired SAE 10W-40 multigrade lubricating oil. The amount of HVI 250N base oil stock and the amount of VI improver actually used are summarized in the Table set forth hereinafter. After the multigrade lubricating oils were prepared the kinematic viscosity at 100° C., the viscosity index, the cold cranking simulator (CCS) viscosity at −20° C., the engine oil pumpability at −25° C. using the mini-rotary viscometer (MRV) technique (ASTM D4684), the high temperature high shear rate (HTHSR) viscosity at 150° C. and at $1 \times 10^6$ sec$^{-1}$ using the tapered bearing simulator (TBS) technique (ASTM D4683) and the mechanical shear stability, as reflected by the % loss in viscosity, using the DIN test (ASTM D 3945) were determined for each of the lubricating oil compositions. For convenience, the first through the fifth compositions prepared in this Example are identified in the table as compositions Nos. 6-10, respectively.

TABLE

| Composition No. | % HVI 250 N | Total Polymer % wt. | KV, 100° C., cSt | Viscosity Index | CCS, −20° C., cP | TP1-MRV −25° C., cP | TBS, 150° C., cP | DIN Test, % Vis. Loss |
| --- | --- | --- | --- | --- | --- | --- | --- | --- |
| 6 | 31.9 | 0.80 | 13.62 | 154 | 3,183 | 16,194 | 3.10 | 36.7 |
| 7 | 24.5 | 1.27 | 14.06 | 108 | 3,207 | 20,719 | 3.63 | 14.0 |
| 8 | 30.0 | 0.96 | 13.87 | 139 | 3,160 | 16,997 | 3.31 | 28.2 |
| 9 | 31.6 | 0.76 | 14.12 | 141 | 3,251 | 18,443 | 3.23 | 34.4 |
| 10 | 33.3 | 0.72 | 14.01 | 154 | 3,317 | 16,166 | 3.06 | 34.4 |

As will be apparent from the data summarized in the preceding table, approximately 7% less VI improver was required in preparing composition 8 than would have been expected. Moreover, the permanent shear stability and HTHSR viscosity values were significantly higher than when the diblock copolymer is used alone. As will also be apparent from the data summarized in the preceding table, composition 10 required approximately 7.7% less VI improver than would have been expected. With the particular blend used in preparation of composition 10, the improved thickening efficiency was achieved with no significant change in the viscometric properties or shear stability of the paired system at least when compared to a multigrade oil prepared with the diblock alone as the sole VI improver component.

EXAMPLE 11

In this Example, two SAE 10W-40 multigrade lubricating oil compositions were prepared with two different selectively hydrogenated linear diblock copolymers. The first of the multigrade oil compositions was prepared with a linear diblock copolymer comprising a polystyrene block having a peak average molecular weight of 9,000 and a polyisoprene block having a peak average molecular weight of 67,000. The second of multigrade oil compositions was prepared with a linear diblock copolymer comprising a polystyrene block having a peak molecular weight of 21,000 and a polyisoprene block having a peak molecular weight of 69,000. Both of the selectively hydrogenated linear diblock copolymers were hydrogenated so as to convert (saturate) about 99% of the ethylenic unsaturation without any significant conversion (saturation) of the aromatic unsaturation contained therein. The SAE 10W-40 multigrade lubricating oil compositions were prepared in the same manner as is summarized in Example 2. After the SAE 10W-40 multigrade lubricating oil compositions were prepared, the kinematic viscosity of each was determined using the same method as is summarized in Example 2. After the SAE 10W-40 multigrade lubricating oil compositions were prepared, the kinematic viscosity of the first of the multigrade oil compositions was 14.02 cSt and the kinematic viscosity of the second was 14.06. Portions of each of SAE 10W-40 multigrade lubricating oil compositions were then blended with equal volumes of SAE 10W-40 multigrade lubricating oil prepared with asymmetric radial polymers identical to those identified as Asymmetric Polymer No. 5, 6, 10 and 11 in Example 1. These SAE 10W-40 multigrade oil were identical to those prepared in Example 2 with these same Asymmetric Polymers. After each of these blends were prepared, the kinematic viscosity at 100° C. of each was determined and the value obtained compared to the kinematic viscosity that would have been expected. The results actually obtained are summarized in the following Table. For convenience, the expected kinematic viscosity is shown in parenthesis just after the actual value obtained.

TABLE

| SAE 10W-40 Blend | | |
|---|---|---|
| Diblock Copolymer | Asymmetric Polymer | Kinematic Viscosity, 100° C.,cSt |
| First | 5 | 13.54 (13.91) |
| First | 6 | 13.69 (14.12) |
| First | 10 | 13.53 (14.03) |
| First | 11 | 13.47 (13.95) |
| Second | 5 | 13.73 (13.93) |
| Second | 6 | 13.96 (14.15) |
| Second | 10 | 13.07 (14.05) |
| Second | 11 | 13.72 (13.97) |

As will be apparent from the data summarized in the preceding Table, none of the polymeric blends tested as VI improvers resulted in an increased thickening efficiency. This failure is attributed to the low peak molecular weight of the polystyrene block in the linear diblock copolymer.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A polymeric blend comprising a selectively hydrogenated asymmetric radial polymer having at least one polymeric arm containing one or more hydrogenated conjugated dioelfin monomer units and at least one arm which is a selectively hydrogenated diblock copolymer having a single polymeric block containing monoalkenyl aromatic hydrocarbon monomer units and a single polymeric block containing hydrogenated conjugated diolefin monomer units and a selectively hydrogenated linear diblock copolymer having a single polymeric block containing predominantly monoalkenyl hydrocarbon monomer units and a single polymeric block containing hydrogenated conjugated diolefin monomer units.

2. The polymeric blend of claim 1 wherein said asymmetric polymer contains from about 6 to about 13 total arms as determined by GPC on a polystyrene scale and the ratio of arms containing hydrogenated conjugated diolefin monomer units to diblock copolymer units is within the range from about 1:1 to about 10:1.

3. The polymeric blend of claim 2 wherein said asymmetric radial polymer is present at a concentration within the range from about 10 to about 90 wt %, based on total polymer, and the selectively hydrogenated linear diblock copolymer is present at a concentration within the range from about 90 to about 10 wt %, based on total polymer.

4. The polymeric blend of claim 3 wherein the polymeric block containing predominantly monoalkenyl aromatic hydrocarbon monomer units in the block copolymer arms of the asymmetric radial polymer has a peak molecular weight as determined by GPC within the range from about 25,000 to about 100,000, the polymeric block containing predominantly conjugated diolefin monomer units in the asymmetric radial polymer has a peak molecular weight as determined by GPC within the range from about 25,000 to about 125,000 and the conjugated diolefin arms of the asymmetric radial polymer have peak molecular weights as determined by GPC within the range from about 25,000 to about 125,000.

5. The polymer blend of claim 4 wherein the polymeric block containing predominantly monoalkenyl aromatic hydrocarbon monomer units of the linear diblock copolymer has a peak molecular weight within the range from about 25,000 to about 100,000 and the polymeric block containing predominantly conjugated diolefin monomer units in the linear diblock copolymer has a peak molecular weight within the range from about 25,000 to about 200,000.

6. The polymer blend of claim 5 wherein the polymer blocks containing predominantly monoalkenyl aromatic hydrocarbon monomer units in both the asymmetric radial polymer and the linear diblock copolymer are homopolymers.

7. The polymer blend of claim 6 wherein the conjugated diolefin polymer arms of the asymmetric radial polymer are homopolymers and the polymeric blocks containing predominantly conjugated diolefin monomer units in both the asymmetric radial polymer and the linear diblock copolymer are homopolymers.

8. The polymer blend of claim 7 wherein the homopolymer blocks containing predominantly monoalkenyl aromatic hydrocarbon monomer units in both the asymmetric radial polymer and the linear, selectively hydrogenated diblock copolymer are polystyrene.

9. The polymer blend of claim 8 wherein the selectively hydrogenated conjugated diolefin homopolymer arms contained in the asymmetric radial polymer and the conjugated diolefin homopolymer polymer blocks contained in both the asymmetric radial polymer and the linear, selectively hydrogenated diblock copolymer are polyiosprene.

10. The polymer blend of claim 1 wherein the peak molecular weight of the polymer block containing predominantly monoalkenyl aromatic monomer units in the block copolymer arm is from about 0.65 to about 7.5 times the molecular weight of the polymeric block containing predominantly conjugated diolefin monomer units in the block copolymer arm and the molecular weight of the polymeric arm containing conjugated diolefin monomer units in the block copolymer arm is from about 0.8 to about 1.2 times the peak molecular weight as determined by GPC of the conjugated diolefin polymer arms.

11. The polymer blend of claim 10 wherein the peak molecular weight of the polymeric block containing predominantly monoalkenyl aromatic hydrocarbon monomer units in the block copolymer of the asymmetric arm is from about 0.7 to about 5 times the peak molecular weight of the polymer block containing predominantly conjugated diolefin monomer units in the block copolymer arm of the asymmetric radial polymer and wherein the peak molecular weight of this conjugated diolefin block is from about 0.8 to about 1.2 times the peak molecular weight of the conjugated diolefin polymer arms.

12. The polymer blend of claim 11 wherein the peak molecular weight of the polymeric block containing predominantly monoalkenyl aromatic hydrocarbon monomer units of the block copolymer arm of the asymmetric radial polymer is from about 0.8 to about 2.5 times the peak molecular weight of the polymeric block comprising predominantly conjugated diolefin monomer units and the peak molecular weight of this conjugated diolefin polymer block is from about 0.8 to about 1.2 times the peak molecular weight of the conjugated diolefin polymer arms.

13. The polymeric blend of claim 1 wherein the peak molecular weights of monoalkenyl aromatic hydrocarbon polymer blocks of the block copolymer arms of the asymmetric radial polymer and of the diblock copolymer differ by less than about 60,000 and the peak molecular weights of the conjugated diolefin polymer blocks of the block copolymer arms of the asymmetric radial polymer and the diblock copolymer differ by no more than 60,000.

14. The polymeric blend of claim 1 wherein the peak molecular weights of monoalkenyl aromatic hydrocarbon polymer blocks of the block copolymer arms of the asymmetric radial polymer and of the diblock copolymer differ by less than about 25,000 and the peak molecular weights of the conjugated diolefin polymer blocks of the block copolymer arms of the asymmetric radial polymer and the diblock copolymer differ by no more than 25,000.

15. The polymeric blend of claim 1 wherein the peak molecular weights of monoalkenyl aromatic hydrocarbon polymer blocks of the block copolymer arms of the asymmetric radial polymer and of the diblock copolymer differ by less than about 10,000 and the peak molecular weights of the conjugated diolefin polymer blocks of the block copolymer arms of the asymmetric radial polymer and the diblock copolymer differ by no more than 10,000.

16. An oil composition comprising a selectively hydrogenated asymmetric radial polymer comprising at least one polymeric arm containing hydrogenated conjugated diolefin monomer units and at least one block copolymer arm comprising a single polymeric block containing predominantly monoalkenyl aromatic hydrocarbon monomer units and a single polymeric block containing predominantly hydrogenated conjugated diolefin monomer units and a linear, selectively hydrogenated diblock copolymer containing a single polymeric block containing predominantly monoalkenyl aromatic hydrocarbon monomer units and a single polymeric block containing predominantly hydrogenated conjugated diolefin monomer units.

17. The oil composition of claim 16 wherein said asymmetric polymer contains from about 6 to about 13 total arms as determined by GPC and the ratio of arms containing hydrogenated conjugated diolefin monomer units to diblock copolymer units is within the range from about 1:10 to about 10:1.

18. The oil composition of claim 17 wherein said asymmetric radial polymer is present at a concentration within the range from about 10 to about 90 wt %, based on total polymer and the selectively hydrogenated linear diblock copolymer is present at a concentration within the range from about 90 to about 10 wt % based on total polymer.

19. The oil composition of claim 18 wherein the polymeric block containing predominantly monoalkenyl aromatic hydrocarbon monomer units in the block copolymer arms of the asymmetric radial polymer has a peak molecular weight as determined by GPC within the range from about 25,000 to about 100,000, the polymeric block containing predominantly conjugated diolefin monomer units in the asymmetric radial polymer has a peak molecular weight as determined by GPC within the range from about 25,000 to about 125,000 and the conjugated diolefin arms of the asymmetric radial polymer have peak molecular weights as determined by GPC within the range from about 25,000 to about 125,000.

20. The oil composition of claim 19 wherein the polymeric block containing predominantly monoalkenyl aromatic hydrocarbon monomer units of the diblock copolymer has a peak molecular weight within the range from about 25,000 to about 100,000 and the polymeric block containing predominantly conjugated diolefin monomer units and the diblock copolymer has a peak molecular weight within the range from about 25,000 to about 200,000.

21. The oil composition of claim 20 wherein the polymer blocks containing predominantly monoalkenyl aromatic hydrocarbon monomer units in both the asymmetric radial polymer and the linear diblock copolymer are homopolymers.

22. The oil composition of claim 21 wherein the conjugated diolefin polymer arms of the asymmetric radial polymer are homopolymers and the polymeric blocks containing predominantly conjugated diolefin monomer units in both the asymmetric radial polymer and the linear diblock copolymer are homopolymers.

23. The oil composition of claim 22 wherein the homopolymer blocks containing predominantly monoalkenyl aromatic hydrocarbon monomer units in both the asymmetric radial polymer and the linear, selectively hydrogenated diblock copolymer are polystyrene.

24. The oil composition of claim 23 wherein the selectively hydrogenated conjugated diolefin homopolymer arms contained in the asymmetric radial polymer and the conjugated diolefin homopolymer polymer blocks contained in both the asymmetric radial polymer and the linear, selectively hydrogenated diblock copolymer are polyiosprene.

25. The oil composition of claim 16 wherein the peak molecular weight of the polymer block containing predominantly monoalkenyl aromatic monomer units in the block copolymer arm is from about 0.65 to about 7.5 times the molecular weight of the polymeric block containing predominantly conjugated diolefin monomer units in the block copolymer arm and the molecular weight of the polymeric arm containing conjugated diolefin monomer units and the block copolymer arm is from about 0.8 to about 1.2 times the peak molecular weight as determined by GPC of the conjugated diolefin polymer arms.

26. The oil composition of claim 25 wherein the peak molecular weight of the polymeric block containing predominantly monoalkenyl aromatic hydrocarbon monomer units in the block copolymer of the asymmetric arm is from about 0.7 to about 5 times the peak molecular weight of the polymer block containing predominantly conjugated diolefin monomer units in the block copolymer arm of the asymmetric radial polymer and wherein the peak molecular weight of this conjugated diolefin block is from about 0.8 to about 1.2 times the peak molecular weight of the conjugated diolefin polymer arms.

27. The oil composition of claim 26 wherein the peak molecular weight of the polymeric block containing predominantly monoalkenyl aromatic hydrocarbon monomer units of the block copolymer arm of the asymmetric radial polymer is from about 0.8 to about 2.5 times the peak molecular weight of the polymeric block comprising predominantly conjugated diolefin monomer units and the peak molecular weight of this conjugated diolefin polymer block is from about 0.8 to about 1.2 times the peak molecular weight of the conjugated diolefin polymer arms.

28. The oil composition of claim 16 wherein the peak molecular weights of monoalkenyl aromatic hydrocarbon polymer blocks of the block copolymer arms of the asymmetric radial polymer and of the diblock copolymer differ by less than about 60,000 and the peak molecular weights of the conjugated diolefin polymer blocks of the block copolymer arms of the asymmetric radial polymer and the diblock copolymer differ by no more than 60,000.

29. The oil composition of claim 16 wherein the peak molecular weights of monoalkenyl aromatic hydrocarbon polymer blocks of the block copolymer arms of the asymmetric radial polymer and of the diblock copolymer differ by less than about 25,000 and the peak molecular weights of the conjugated diolefin polymer blocks of the block copolymer arms of the asymmetric radial polymer and the diblock copolymer differ by no more than 25,000.

30. The oil composition of claim 16 wherein the peak molecular weights of monoalkenyl aromatic hydrocarbon polymer blocks of the block copolymer arms of the asymmetric radial polymer and of the diblock copolymer differ by less than about 10,000 and the peak molecular weights of the conjugated diolefin polymer blocks of the block copolymer arms of the asymmetric radial polymer and the diblock copolymer differ by no more than 10,000.

* * * * *